US007725210B2

(12) United States Patent
Hoebel et al.

(10) Patent No.: US 7,725,210 B2
(45) Date of Patent: May 25, 2010

(54) METHOD OF PROCESSING TURBINE COMPONENTS (75) Inventors: Matthias Hoebel, Baden (CH); Bernd Fehrmann, Baden (CH); Christoph Kohles, Mitwitz (DE); Karsten Franitza, Baden (CH)

(73) Assignee: Alstom Technology Ltd, Baden (CH)

( * ) Notice: Subject to any disclaimer, the term of this patent is extended or adjusted under 35 U.S.C. 154(b) by 345 days.

(21) Appl. No.: 11/734,352

(22) Filed: Apr. 12, 2007

(65) Prior Publication Data
US 2007/0241084 A1 Oct. 18, 2007

(30) Foreign Application Priority Data
Apr. 13, 2006 (EP) ................... 06112639

(51) Int. Cl.
B23K 26/38 (2006.01)
B23K 26/03 (2006.01)

(52) U.S. Cl. ............. 700/166; 219/121.71; 219/121.83; 382/171; 700/195

(58) Field of Classification Search ............ 219/121.72, 219/121.83; 700/166, 195; 382/171
See application file for complete search history.

(56) References Cited

U.S. PATENT DOCUMENTS

| 5,153,721 | A | 10/1992 | Eino et al. |
| 6,375,425 | B1 | 4/2002 | Lee et al. |
| 6,380,512 | B1 * | 4/2002 | Emer .................... 219/121.71 |
| 6,606,528 | B1 * | 8/2003 | Hagmeier et al. ............. 700/98 |
| 7,043,290 | B2 * | 5/2006 | Young et al. ................ 600/416 |
| 7,078,073 | B2 * | 7/2006 | Rigney et al. ............... 427/142 |
| 2003/0045131 | A1 * | 3/2003 | Verbeke et al. .............. 438/795 |
| 2004/0089983 | A1 * | 5/2004 | Jamalabad et al. .......... 264/497 |
| 2005/0137829 | A1 * | 6/2005 | Gimelfarb et al. ........... 702/171 |
| 2006/0208396 | A1 * | 9/2006 | Abe et al. .................... 264/497 |
| 2007/0013915 | A1 * | 1/2007 | Van Asten et al. ........... 356/498 |
| 2008/0123914 | A1 * | 5/2008 | De Bliek et al. ............ 382/128 |

FOREIGN PATENT DOCUMENTS

| EP | 1510283 | * | 2/2005 |
| EP | 1 510 283 | | 3/2005 |
| EP | 1767743 | | 3/2007 |

OTHER PUBLICATIONS

Answers.com dictionary, http://www.answers.com/interpolation.*
Stratasys, Inc., "QuickSlice Manual", Jun. 17, 1996, pp. 1, Q6-Q9.*

* cited by examiner

Primary Examiner—Ramesh B Patel
Assistant Examiner—Olvin Lopez
(74) Attorney, Agent, or Firm—Leydig, Voit & Mayer (57) ABSTRACT A method of removing unwanted coating material from cooling passages of a turbine component includes determining coordinates of the position and orientation of cooling passages at the surface of the turbine component and determining reference points in the region of the cooling passages. After coating of the turbine component, the reference points are measured once again and the thickness of the coating is calculated. In a basic processing program, the data for the position, passage orientation and coating thicknesses and also CAD data for the cooling passages are interlinked and a laser processing program is automatically adapted for each individual cooling passage. Using the laser processing program, a pulsed laser is guided over disk-shaped volume segments of the unwanted coating material and the material is removed in the process.

19 Claims, 6 Drawing Sheets

Fig. 5

METHOD OF PROCESSING TURBINE COMPONENTS

Priority is claimed to European Patent Application No. 06112639.7, filed on Apr. 13, 2006, the entire disclosure of which is incorporated by reference herein.

The present invention relates to a method of processing turbine components and in particular cooling passages on turbine components, such as gas turbine blades for example.

BACKGROUND

During operation of a gas turbine, the components, inter alia turbine blades, blade carriers and blade platforms, are exposed to hot gas temperatures of over 1400° C. The turbine components in the hot gas region are provided with a metallic oxidation layer and also often with a ceramic thermal-insulating layer, also called "thermal barrier coating" (TBC), such that the material can withstand these temperatures. In addition, the turbine components are cooled by means of cooling air, which flows through a complex system of cooling passages. The cooling passages open out to the surface of the components and often have in the region of the surface a specific three-dimensional shape which ensures film cooling of the component surface by the cooling air. In order to ensure reliable operation of the turbine, certain components, in particular turbine blades, are removed and replaced after an operating interval, for example of 20000 hours. In this case, it is commercially advantageous to recondition turbine blades and use them again for an operating interval. During reconditioning, the protective layers are typically removed and applied again, the outlet openings of the cooling passages being obstructed by the protective layer material applied again. In order to achieve full cooling capacity, the cooling passages must be opened again, in which case the geometry of the original cooling air holes should preferably be restored as accurately as possible.

In a turbine blade used nowadays, several hundred individual cooling passages, for example, are distributed at the surfaces, and these cooling passages can be divided, for example, into about twenty different basic types of passage. The basic types differ, for example, in their orientation relative to the surface of the turbine component, in the size of their cross section or in the angles of spread in the outlet region of the cooling passages.

Recoating is in many cases carried out by plasma spraying and with a spraying direction that is as perpendicular as possible to the component surface. The obstruction of the individual cooling passages therefore varies greatly, depending on the orientation and cross-sectional size of the passages and on their position relative to the contour of the component. In addition, the restoration of the original passage geometry is made more difficult by the large tolerances of the plasma spraying process by virtue of the fact that the thickness of the obstructing material can be predicted only to a limited extent.

EP 1 510 283 discloses a method of restoring cooling passages in turbine blades. First of all a local reference coordinate system is prepared by means of characteristic features of the component. In an automated scanning process, the three-dimensional positions and orientations of each cooling passage which are related to a local reference coordinate system are determined. The position and orientation data are then used for removing the obstructing coating material and for restoring the original cooling passage. The unwanted material is removed by vaporization by means of a pulsed laser (laser ablation).

SUMMARY OF THE INVENTION

An object of the present invention is to provide a method of processing a turbine component having a multiplicity of geometrically different cooling passages. The processing is to include recoating and freeing the cooling passages of coating material which has narrowed the cooling passages during the coating. Compared with the methods of the prior art, the method is preferably optimized with regard to both the processing time and the processing quality, in particular the processing precision. In particular, the method is to be capable of being adapted to each individual cooling passage on the turbine component.

According to the invention, a turbine component is processed in a plurality of method steps for recoating and for freeing the cooling passages of coating material. The turbine component has a multiplicity of different cooling passages (with respect to their geometry) and is uncoated at the start of the method. The turbine part may therefore be a newly produced turbine component which has still not been coated or a turbine component that has already been in operation and whose coating has been removed.

In a first method step, a local reference coordinate system is prepared at the coating-free turbine component and three-dimensional coordinates are determined for the respective positions of the cooling passages at the surface of the component and for the respective spatial orientations of the cooling passages.

In a second method step, various reference points are determined in the region of the outlet openings of the cooling passages at the turbine component.

In an embodiment of the method, the reference points are selected on a line around the respective center point of the outlet opening of a cooling passage.

To this end, a contactless distance sensor is fastened on a robot arm and is moved along a line around the outlet opening during the measuring of the reference points. The movement of the robot with distance sensor for determining the reference points is stored.

In a third method step, the turbine component is provided with a new coating.

In a fourth method step, the movement of the robot with distance sensor stored in step II is repeated and new reference points are recorded on the coated turbine component. From these measured data, the distances between the reference points before and after the coating are determined together with the coordinates of the reference points from the second step, and the local coating thickness in the region of the cooling passages is calculated.

In a fifth step, a laser processing program is automatically produced for each individual cooling passage on the turbine component. To this end, the data from the preceding method steps, that is to say position and orientation data and coating thickness data in the region of the cooling passage outlet, and also CAD data of the individual cooling passages which are known from the production of the turbine component are interlinked by means of a basic processing program. From the layer thickness measurements around the outlet openings of the cooling passages together with CAD data for the cooling passages which are known from the production of the turbine component, a volume model of the unwanted coating material in the cooling passages is produced. This volume model is then subdivided into a number of disk-shaped volume segments lying one on top of the other. The automatically prepared laser processing program automatically produces parameter values and geometrical data for the guidance of a pulsed laser over the individual disk-shaped volume segments for removing the unwanted coating material from the cooling passage. The laser processing program contains the geometrical coordinates for the guidance of the laser and also values of the laser power, laser pulse energy, pulse duration, pulse repetition rate, pulse height, overlap of successive pulses, rate of movement of the laser relative to the turbine component, and the repetition rate of the movements over a given disk-shaped volume segment. The individual adaptation of the laser processing to each individual cooling passage of each individual component is effected via a basic processing program which is modified automatically according to fixed rules. Measured positions, orientations and layer thicknesses are used for this purpose.

In a sixth and final step, a pulsed laser, by control according to the laser processing program prepared in the fifth step, is guided over the individual, disk-shaped volume segments and in the process the unwanted coating material is removed by vaporization. For the precision processing process, the material removal and the removal rate are in this case adapted to the different respective cooling passage geometries and the different respective coating thicknesses.

The automatically prepared processing program permits the individual processing of each individual cooling passage according to the existing layer thickness. By the preparation of the program for each cooling passage being automated, the preparation time for each individual adaptation of the laser processing program is greatly reduced compared with methods of the prior art.

On account of the automation according to the invention, the restoring of the cooling passages after coating can be carried out within an acceptable processing period.

In the method according to EP 1 510 283, in contrast, an individual type of cooling passage is processed. With the method there, processing of different cooling passages is only possible by individual adaptation of the laser parameters and coordinates to each individual cooling passage. In addition, only restricted precision of the material processing is possible on account of the lack of layer thickness information.

BRIEF DESCRIPTION OF THE DRAWINGS

The method according to the invention is explained in more detail with reference to the drawings, in which:

FIGS. 3a-d show a schematic illustration of the method steps for measuring the coating thicknesses, of which:

FIGS. 5a-p show an example of a sequence of various disk-shaped segments of coating material which serves as a basis for the pattern of movement for a laser for removing unwanted coating material from a cooling passage.

DETAILED DESCRIPTION

Figure 1A:
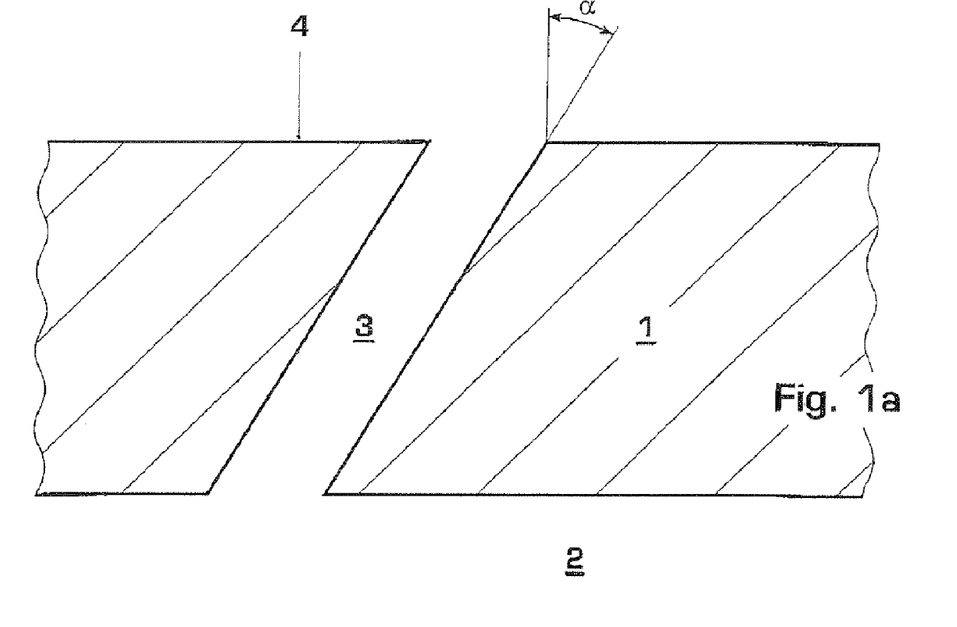
FIG. 1a shows a detail of a turbine component having a cooling passage.
Figure 1B:
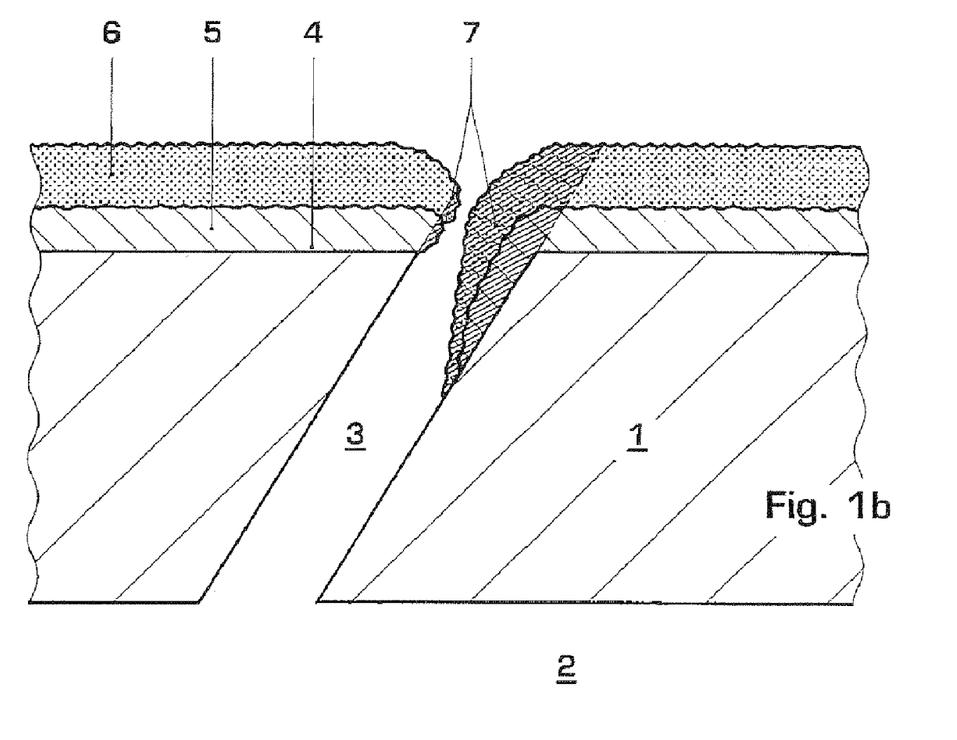
FIG. 1b shows the detail of a turbine component having a cooling passage of FIG. 1a after the turbine component has been coated.

FIG. 1a shows a greatly enlarged detail of a turbine component 1, for example a cooled gas turbine blade, having a cavity 2 and a cooling passage 3, for example a formed hole or a cooling passage produced by casting, for a cooling flow, for example air, another gas or steam. The cooling passage 3 leads from the cavity 2 to the surface 4 of the turbine component 1. In typical cases, a cooling passage 3 is directed at a small angle $\alpha$ to the surface 4, for example at 70° to the surface normal, which as a rule serves for film cooling of the surface. The cooling passages are often cylindrical, but are also designed with a widening outlet region. FIG. 1a shows the turbine part following a certain operating period in a turbine and after the original protective coating on the surface of the turbine component has first of all been removed in connection with normal reconditioning of the turbine component. FIG. 1b shows the same turbine component 1 having the cooling passage 3 after new protective coating. The protective coating consists, for example, of two layers, a first metallic layer 5 and a second heat-insulating layer 6 (thermal barrier coating TBC). Located in the region of the cooling passage outlet is coating material which narrows the original cooling passage at its outlet and which would greatly impair the cooling flow and thus the cooling capacity of the cooling passage. In addition, the altered shape of the cooling outlet would also change the direction of the discharging cooling flow and would no longer ensure film cooling, as a result of which the cooling capacity would again be impaired. With regard to the original cooling capacity of the passage, the coating material 7 shown hatched is unwanted.

A typical turbine component, such as a turbine blade for example, has several hundred cooling passages of that kind, said cooling passages differing in diameter, orientation relative the surface of the turbine part and angle of spread in the region of the passage outlet.

Figure 2:
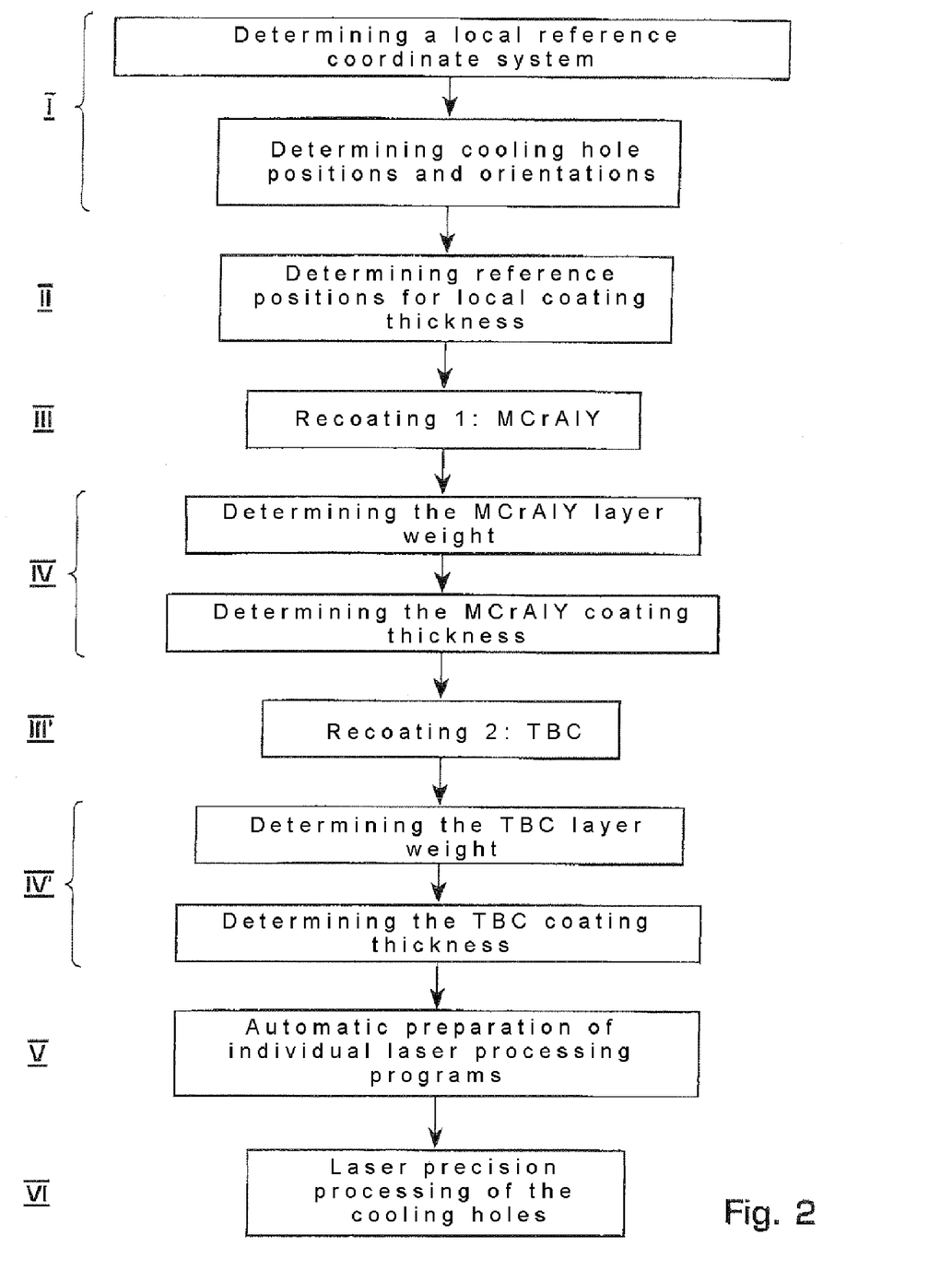
FIG. 2 shows a flow chart of the method steps according to the invention for processing the cooling passages in the event of unwanted material in the cooling passages.

According to the flow chart in FIG. 2, first of all a local reference coordinate system is determined in the first step I of the method for an uncoated turbine component. (The turbine component has already been in operation, for example, and the existing coating has been removed from it for the purposes of reconditioning.) For the local reference coordinate system, the component is fastened in a holder. With reference to characteristic shapes, such as, for example, edges, recesses, sealing grooves or other special geometries of the turbine component, a plurality of discrete points are measured, with which a local coordinate system on the turbine component itself is produced. This coordinate system can be used as a local reference coordinate system again at any time, for example after the component has been removed from the processing table and fitted again. As a result, further, stored points on the component, e.g. cooling passage positions, or the reference points for determining the layer thicknesses can always be found relative to this local coordinate system.

After that the spatial coordinates of the cooling passage positions on the surface of the turbine component and spatial direction vectors of the cooling passages are determined. Step I, and also the following steps II and IV, may be carried out, for example, by means of a laser distance sensor together with a high-resolution camera system, which are both mounted on an industrial robot.

According to the second step II, reference points on the turbine component are determined relative to the local coordinate system by means of the distance sensor, which reference points are used in a subsequent step for determining the local coating thickness, that is to say the coating thickness in the region of the outlet openings of the cooling passages.

Figure 3A:
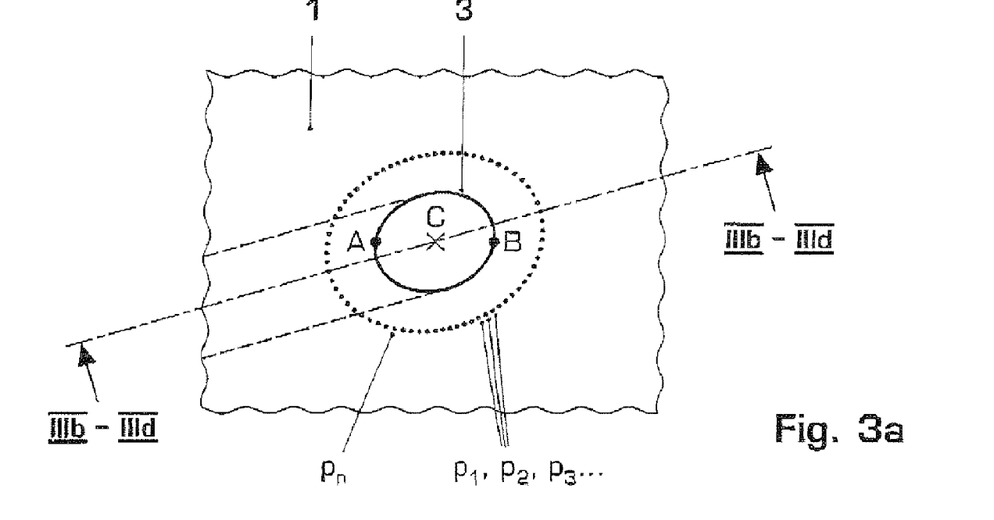
FIG. 3a shows a plan view of a cooling passage on the turbine component and reference points on a circular line around the cooling passage.

Suitable reference points $P_1, P_2, P_3, \ldots P_n$ are points in a defined geometrical arrangement relative to the cooling passage around the cooling passage outlet. For example, this may be on a circular line around the center point of the cooling passage outlet, as shown in FIG. 3a. The reference points may also be selected on any desired line around the outlet openings of the cooling passages which is adapted to the shape of the outlet opening. The center point C is determined by specific algorithms of the robot-controlled distance sensor system and is directly available as a result of the cooling passage determination. Marginal points A and B can be determined from the existing CAD data. A preprogrammed movement (e.g. circular movement) is then carried out about this center point by means of a robot, on which a distance sensor is mounted, and a plurality of reference points $P_1, P_2, P_3, \ldots P_n$ are determined on the component surface about the center point C. The reference points $P_1, P_2, P_3, \ldots P_n$ are measured either at a normal angle, or also at an angle that is possible in accordance with the geometry of the turbine part, relative to the surface of the turbine part. The measuring angle $\beta$ is selected in accordance with the shape and contour of the turbine part and the accessibility of the measuring points to the distance sensor. The results calculated from the measured data recorded during the preprogrammed movement of the robot and the programs of movement of the robot are stored. Thus the measuring point C, the measuring direction M and the coordinates of the reference points $P_1, P_2, P_3, \ldots P_n$ can be used again in step IV. It is possible at any time to carry out further measurements in exactly the same geometrical arrangement, as is necessary, for example, for the following step IV.

Figure 3B:
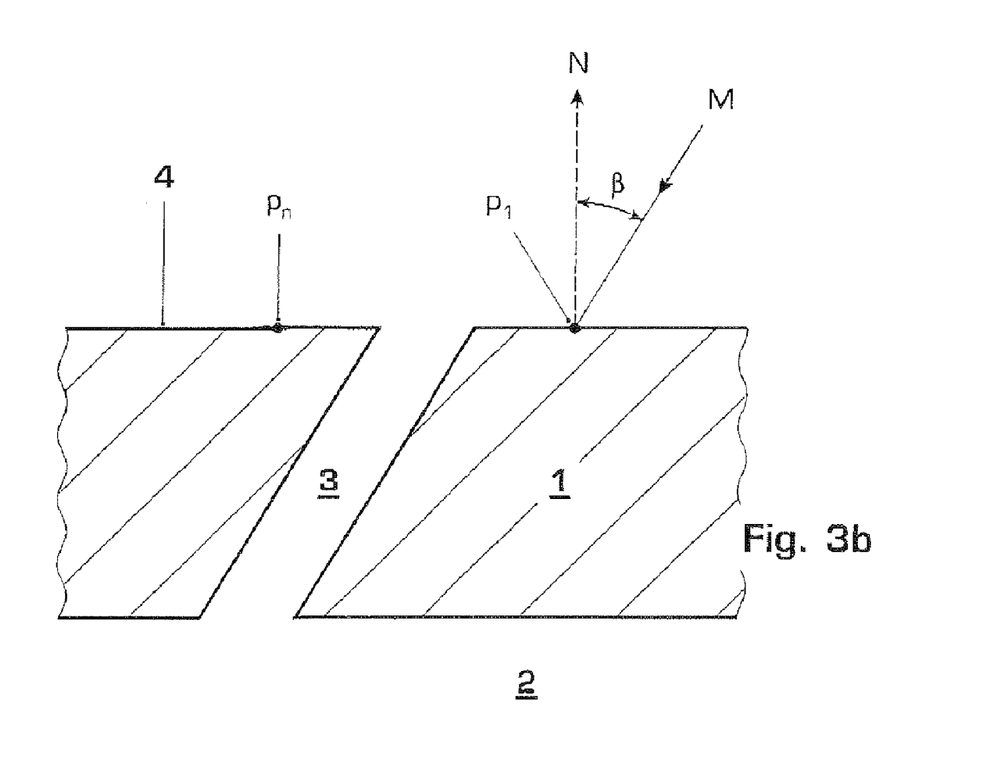
FIGS. 3b-d show the measurement of selected points on the surface without coating, with one layer and with two layers, respectively.

In an embodiment shown in FIG. 3b, the measurement is carried out along the longitudinal axis direction M of the cooling passage 3, the measuring angle $\beta$ being the angle between the measuring direction M and the normal N to the surface 4 of the component 1.

In the third method step III, the turbine component is provided with a first, new protective layer. Taking the example shown, this is a metallic protective layer, for example MCrAlY (where M stands for Ni or Co).

Figure 3C:
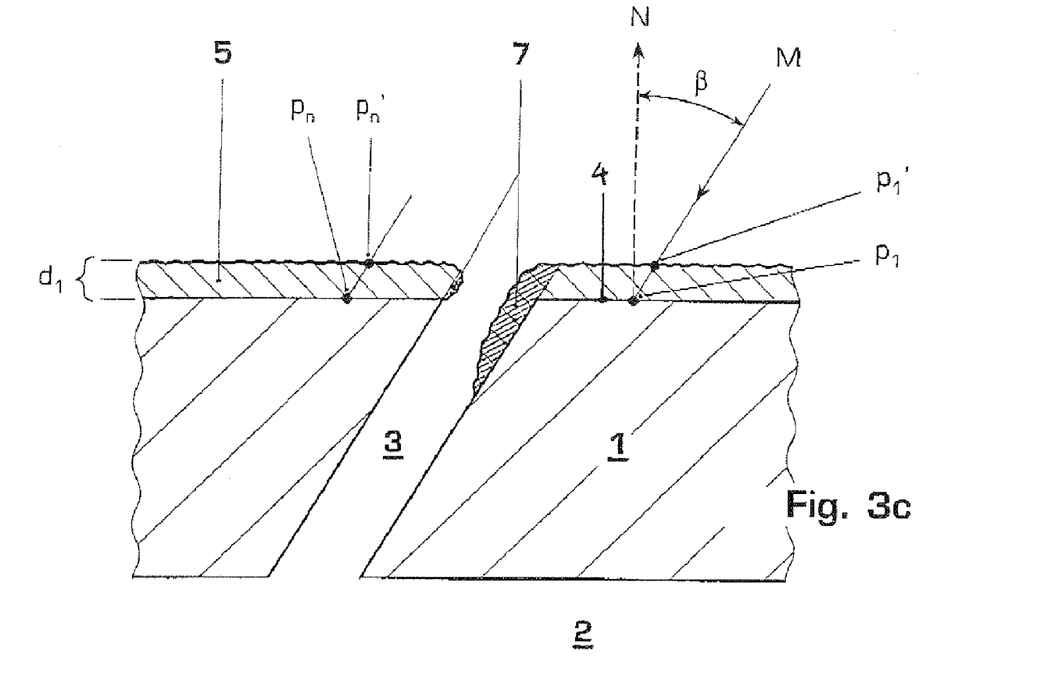

In step IV, the thickness of the coating $d_1$ is determined. As shown in FIG. 3c, new reference points $P_1', P_2', P_3', \ldots P_n'$ in exactly the same geometrical arrangement relative to the cooling air passage as in step II on the coated surface are measured by means of the distance sensor and are stored relative to the local coordinate system. To this end, for example, the stored circular movement from step II with center point C and measuring direction M is carried out again by means of the robot with distance sensor relative to the local reference coordinate system of the turbine part. The distance sensor is therefore directed along the same measuring direction M as in step II toward the reference points $P_1, P_2, P_3, \ldots P_n$ on the component and is guided about the same point C. The distance sensor determines along the measuring direction M the new reference points $P_1', P_2', P_3', \ldots P_n'$ on the surface of the layer 5.

A conoscopic measuring head, for example, as described in Swiss Patent Application No. 2006 0169/06, may be used for the distance measurement in step IV, and also in steps I and II. Other suitable distance measuring instruments are a contactless optical laser distance sensor according to triangulation principle, a contactless optical conoscopic distance sensor, a contactless optical interferometric distance sensor, a measuring probe ("touch probe") or eddy current sensors. The thickness of the coating $d_1$ is determined by means of the distances between the measured reference points $P_1, P_2, P_3, \ldots P_n$ and $P_1', P_2', P_3', \ldots P_n'$ while taking into account the measuring angle $\beta$ and the projection to the surface normal N. The coating thicknesses at points in the outlet opening of a cooling passage are determined by means of extrapolation.

Figure 3D:
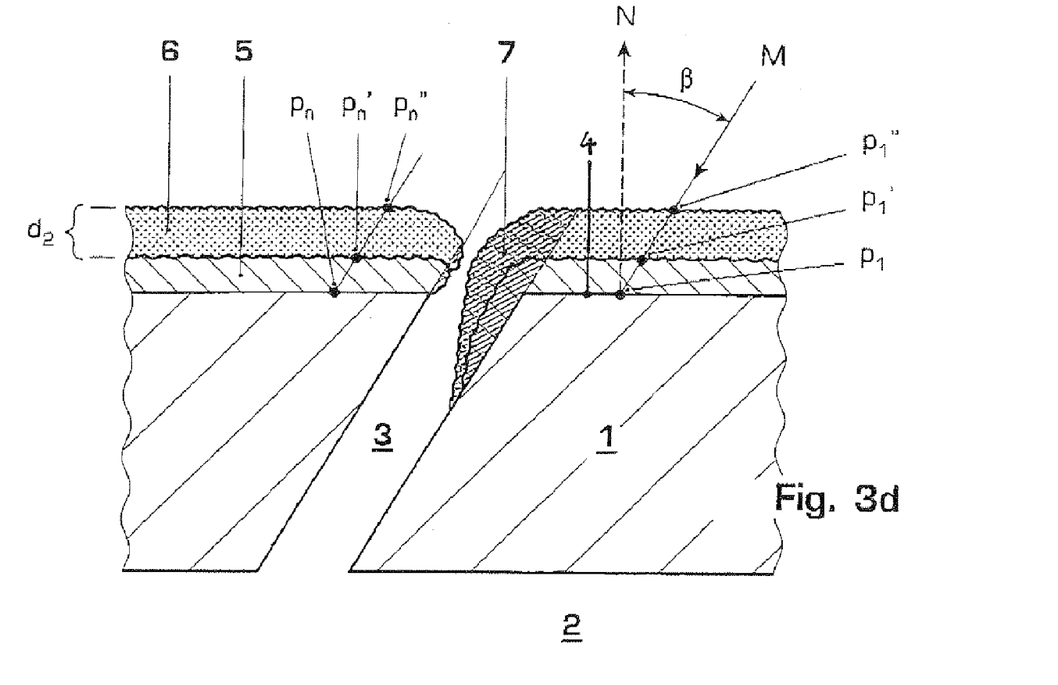

The following steps III' and IV' are a repetition of steps III and IV, but for a second layer. In step III', the second protective layer, for example a heat-insulating layer 6, is applied to the first layer 5. In step IV', the (circular) movement, stored in step II, of the robot in the measuring direction M about the center point C is carried out again and the reference points $P_1'', P_2'', P_3'', \ldots P_n''$ are measured and stored by means of the distance sensor relative to the local coordinate system on the surface of the heat-insulating layer 6. In a similar manner to the first layer, the layer thickness $d_2$ of the heat-insulating layer is determined by means of the distances between the points $P_1', P_2', P_3', \ldots P_n'$ and $P_1'', P_2'', P_3'', \ldots P_n''$ and again while taking into account the measuring angle, as shown in FIG. 3d.

In a variant of the steps III, IV, III' and IV', the circular movement of the robot is carried out at a measuring direction angle $\beta$ of 0° or almost 0°. This is especially advantageous when using a laser distance sensor, since many laser distance sensors are designed for measurements at measuring angles of less than 30°.

In a further, advantageous variant of said method steps, the radius of the circular movement and the measuring direction are selected in such a way that contact with the nearest cooling passages and edges is avoided. This is especially the case with cooling passages in the region of edges of the turbine parts, such as the leading edge of a turbine blade for example.

In a further variant of said method steps, the center point of the circular movement is also selected outside the cooling passage.

The measurement of the reference points before and after each coating is carried out in each case with regard to the local coordinate system. To this end, the characteristic features of the geometries which are used for producing the local coordinate system must of course remain uncoated. In order to ensure that these characteristic contours remain undamaged and uncoated, they are covered with plates or similarly suitable devices. For example, cover plates are attached or clamped by spot welding, the cover plates being removable again and the surfaces not being impaired.

When determining the layer thickness, a simple relationship is obtained between two measurements carried out one after the other. This method allows a long time interval between measurements and even temporary removal of the turbine component from the holder, for example for the purposes of further processing or measurement, without the precision of the measurement being impaired.

In step V, a three-dimensional model of the unwanted coating material in the cooling passages is produced by means of the stored data for position and orientation of the individual cooling passages and the local coating thicknesses in the region of the individual cooling passages and also CAD data of the cooling passages. This volume is then subdivided into a multiplicity of individual disk-shaped volume segments. By means of a basic processing program, an individual laser processing program for removing the individual disk-shaped volume segments of the coating material in the cooling passages is then automatically prepared for each cooling passage. To this end, a suitable basic program is first of all selected from a plurality of different basic processing programs. For example, a program is selected from three basic processing programs for a specific cooling passage, of which the first is orientated toward a thin layer thickness to be expected, the second is oriented toward an average layer thickness and the third is oriented toward a large layer thickness. The suitable basic processing program is selected in accordance with the layer thicknesses measured around the cooling passages.

When preparing the laser processing programs, the selected basic program is adapted in accordance with the measured data for the individual cooling passages. In particular, the data for position, orientation of the passage with respect to the component surface and the precise layer thickness data are introduced here. The basic program is in this case individually adapted with regard to the following laser processing parameters:

average laser power,
average laser pulse energy,
pulse repetition rate,
overlapping of successive laser pulses,
rate of movement of the laser relative to the rate of movement of the turbine component,
selection of disk-shaped volume segments,
number of repetitions of the movement of the laser over a given disk-shaped volume segment.

The decision criteria necessary for the adaptation are partly determined by prior calibration measurements.

The laser processing program contains stipulations for the guidance of a pulsed laser by means of a laser galvano scanner for removing each individual disk-shaped volume segment by repeated movements over the surface region of each disk-shaped volume segment.

Due to the automatic preparation of the laser processing program and the automatic adaptation of the abovementioned laser processing parameters for each cooling passage according to predetermined decision criteria, in particular the preparation time for the individually adapted laser processing for the entire turbine component is greatly reduce compared with methods of the prior art. In addition, comparatively increased precision is made possible by the individual adaptation.

In a first embodiment of the method according to the invention, an individually adapted laser processing program of this type is prepared for each cooling passage, the layer thickness measurement for each individual cooling passage of the turbine component being carried out in advance.

To increase the speed of the method, the layer thickness measurement, in a further embodiment of the method, is only carried out at a defined number of cooling passages which are representative of a group of cooling passages (such as, for example, only selected cooling passages in a cooling passage row). The layer thickness at the cooling passages that are not measured is then extrapolated or interpolated on the basis of measured values. This reduces the complexity of the measurement and storage.

In a further embodiment, likewise for reducing the duration of the method, the layer thickness measurements are taken only on individual selected turbine components of a set of identical turbine components and in each case the distributions of the layer thicknesses are compared with the weight of the coatings over the entire turbine components measured. Assuming that the layer distributions are identical for all the turbine components of a set which have been coated in the same coating sequence, the layer thickness distributions of the remaining turbine components in the set are scaled by determining the layer weight of these components, for example by weighing the turbine part before and after the coating.

In step VI, the unwanted coating material in the cooling passages is then removed by laser vaporization by means of the guided laser. To this end, the processing laser, for example, is guided via a scanner on a laser CNC unit.

Figure 4A:
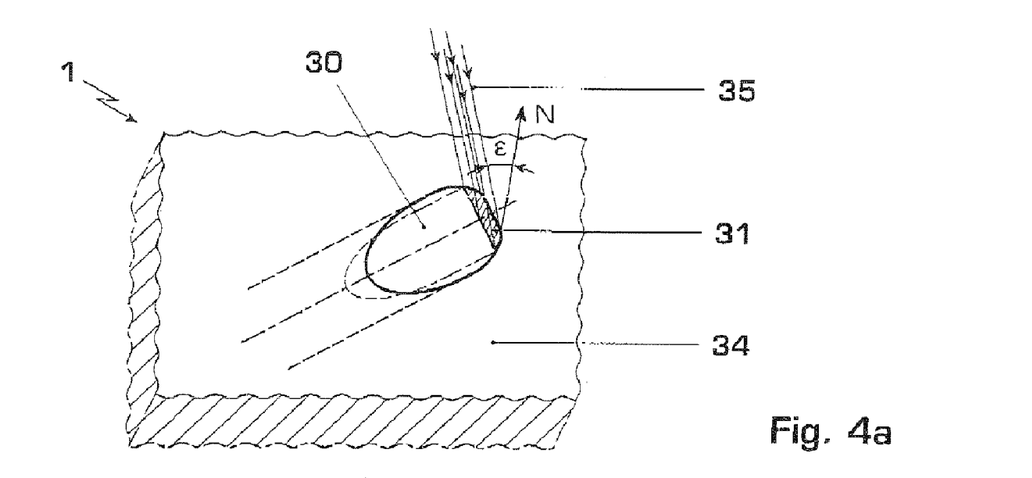
FIGS. 4a-c show examples of disk-shaped coating material, to be removed by the laser, in a cooling passage, each figure showing a disk at a different depth from the surface of the turbine component.
Figure 4B:
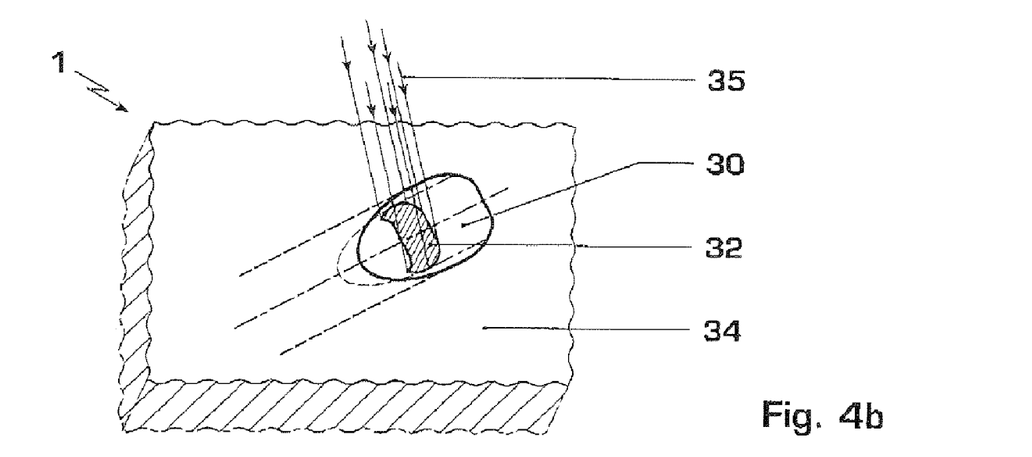
Figure 4C:
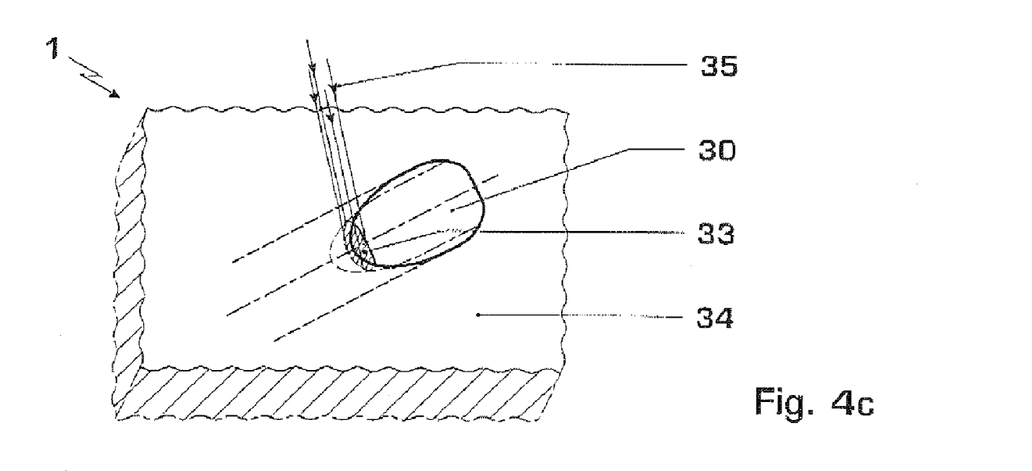

FIGS. 4a-c each show, for a cooling passage 30, an example of disk-shaped volume segments 31-33, in each case at different depths from the surface 34 of the turbine component 1, which are removed by means of a pulsed laser. FIG. 4a shows the segment 31 at a very small depth from the surface 34. Laser beams 35 are indicated which are directed toward the segment 31 at an angle $\epsilon$ to the surface.

FIGS. 4b and 4c show further segments 32 and 33, respectively, at an average and large depth from the surface, and the laser beams 35, which are directed toward said segments 32 and 33 for their removal. In the example shown, the cooling passage 30 runs at an angle of 30° to the surface 34 of the turbine component 1. The laser processing angle $\epsilon$ is 80°. Each processed and removed layer 32 has a thickness of about 50 μm.

Figure 5:
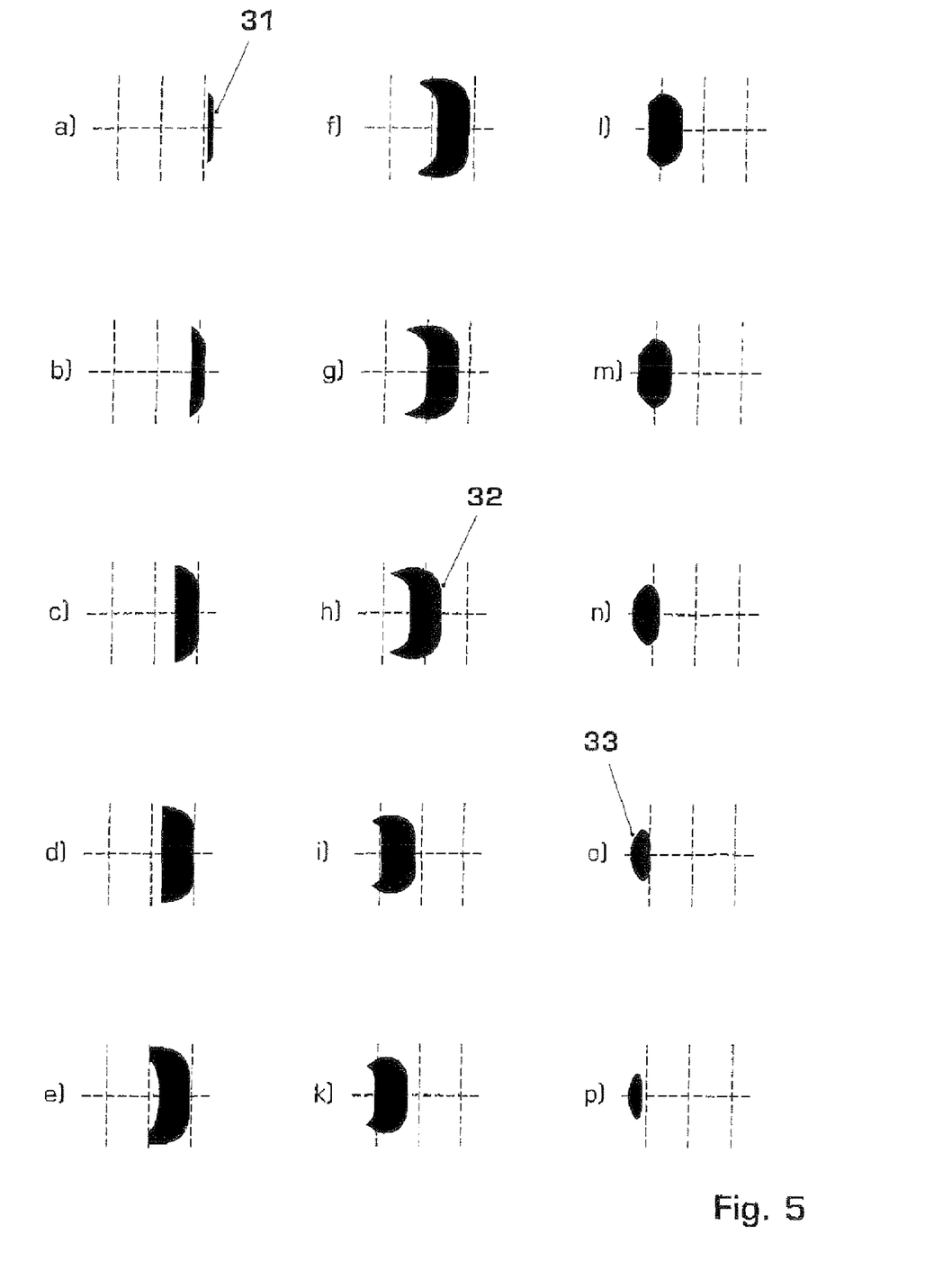

FIGS. 5a to 5p show a sequence of disk-shaped volume segments of the coating material in the cooling passage 30 from FIGS. 4a-c which are removed by a pulsed laser, the volume segments of FIGS. 5a, 5h and 5p each corresponding to those of FIGS. 4a, 4b and 4c, respectively.

The laser is preferably a pulsed laser, such as, for example, a solid-state laser, fiber laser or disk laser with pulse lengths within a range of 5-2000 ns and an intensity within a range of $5\text{-}10^6$ W/cm$^2$ to $3\text{-}10^9$ W/cm$^2$. The individual pulses preferably have energy levels within the range of 0.5 mJ to 50 mJ. Such pulses permit the removal of coating material such as TBC and MCrAlY by vaporization.

A volume segment has a thickness of, for example, 50 or 100 micrometers. Each segment is removed by repeated movement of the laser over the region of the segment, a set of respective laser and process parameters being determined for each segment. The removal rate per laser movement over the surface region of the segment and thus the number of requisite repetitions of the laser movements over the surface region of a segment are obtained in accordance with these parameters. The process and laser parameters are, for example, the average laser power, the average laser pulse energy, the pulse repetition rate and also the time overlap and spatial overlap of successive laser pulses. Further parameters are also the local rate movement of the laser relative to the processing surface. In this case, the removal rate may either be predetermined on the basis of the predetermined laser and process parameters and independent calibration measurements, or it may also be determined during the processing process by a suitable sensor device, such as, for example, a touch probe or a contactless, optical sensor.

Depending on the removal rate, for example 5-30 repetitions of the laser movements per volume segment result.

In a further embodiment of the method according to the invention, the measurement of the position of the cooling passages and of the coating thickness is carried out with a measuring setup consisting of an industrial robot, on which the measuring head for the distance measurement and the camera system are fastened, and of a rotary table, on which the turbine component is mounted. The rotary table moves about its own axis independently of the industrial robot. The industrial robot serves to re-orient the measuring head for every measurement relative to the turbine component. The placing of the turbine component on the rotary table enables not only the industrial robot to be moved for the orientation of the measuring head relative to the turbine component, but also enables the turbine component itself to be oriented relative to the measuring head by means of the rotary table. This enables the industrial robot to carry out smaller movements overall and enables large axis movements of the robot to be dispensed with. This results in the advantage that systematic positioning errors of the industrial robot, which become cumulative during each axis movement, can be reduced by factors and thus the precision of the method can be further increased.

In addition, in a further embodiment of the method, systematic errors in positioning and in measurements are determined and specifically compensated for, as a result of which the precision is again increased.

What is claimed is:

1. A method of processing a turbine component having a plurality of cooling passages, the method comprising:
   i) preparing and storing a local reference coordinate system and determining first three-dimensional coordinates of a position of a cooling passage at an uncoated surface of the turbine component and an orientation of the cooling passage;
   ii) determining second three-dimensional coordinates of a plurality of reference points relative to the local reference coordinate system in a region of an outlet opening of the cooling passage using a movement of a robot with a distance sensor around the outlet opening, and storing the movement of the robot;
   iii) coating the turbine component;
   iv) repeating the robot movement stored in step ii) and determining the third three-dimensional coordinates of a plurality of further reference points on a surface of the coating of the turbine component and calculating a thickness of the coating applied in step iii);
   v) automatically preparing a laser processing program for the cooling passage, wherein the automatically preparing a laser processing program includes producing a volume model using the calculated thickness of the coating, and subdividing the volume model into a plurality of disk-shaped volume segments; and
   vi) guiding a pulsed laser beam according to the laser processing program over a surface of each of the disk-shaped volume segments so as to remove unwanted coating material from the cooling passages.

2. The method as recited in claim 1, wherein the preparing of laser processing program is performed using a basic processing program for linking data from steps i), ii) and iv) and CAD data of the cooling passage.

3. The method as recited in claim 2, wherein step v) includes automatically adapting one or more laser processing parameters for the cooling passage, the laser processing parameters being selected from the group consisting of: an average laser power, an average laser pulse energy, a pulse repetition rate, an overlap of successive laser pulses, a rate of movement of the laser relative to a rate of movement of the turbine component, a selection of disk-shaped volume segments and a number of repetitions of movement of the laser beam over a given disk-shaped volume segment.

4. The method as recited in claim 1, further comprising repeating characterized steps iii) and iv) in accordance with a number of layers in the coating.

5. The method as recited in claim 1, wherein the plurality of reference points lie on a path circumscribing a center point of the outlet opening of the cooling passage.

6. The method as recited in claim 5, wherein the path is circular.

7. The method as recited in claim 1, wherein the calculating of the coating thicknesses is performed based on measured distances between the plurality of reference points before coating and between the plurality of further reference points after coating and on a measuring angle of the passage relative to a normal to the surface of the turbine component.

8. The method as recited in claim 1, further comprising repeating steps i, ii, and iv, for the plurality of cooling passages and wherein the calculating of the coating thicknesses is performed in the region of selected cooling passages that are representative of a group of cooling passages and wherein coating thicknesses at cooling passages not selected are determined using one of interpolation and extrapolation.

9. The method as recited in claim 1, further comprising determining a weight of the coating by weighing the turbine component before and after the coating.

10. The method as recited in claim 9, further comprising repeating the steps i-iii on a plurality of turbine components, and wherein the coating thicknesses of a first group of selected turbine components of a set of identical turbine components are determined, and the coating thicknesses are determined by scaling with reference to a coating weight of a second group of selected turbine components in the set of identical turbine components.

11. The method as recited in claim 1, wherein the coating of the turbine component includes applying a metallic protective layer as a first layer.

12. The method as recited in claim 11, wherein the metallic protective layer is a MCrAlY, and wherein M stands for Ni or Co.

13. The method as recited in claim 11, wherein the coating of the turbine component includes applying a ceramic heat-insulating layer as a second layer to the first layer.

14. The method as recited in claim 1, wherein the guiding of the laser includes guiding at least one of a pulsed solid-state laser, a fiber laser, and a disk laser.

15. The method as recited in claim 14, wherein laser pulses of the pulsed laser have pulse lengths within a range of 5 to 2000 ns and an intensity within a range of $5 \cdot 10^6$ W/cm$^2$ to $3 \cdot 10^9$ W/cm$^2$.

16. The method as recited in claim 1, wherein at least one of the steps i), ii) or iv), is performed using at least one of a contactless optical laser distance sensor according to triangulation principle, a contactless optical conoscopic distance sensor, a contactless optical interferometric distance sensor, a measuring probe, a touch probe and an eddy current sensor.

17. The method as recited in claim 1, wherein at least one of the steps i), ii) and iv) is performed using a laser distance sensor together with a camera system, both of which are mounted on an industrial robot.

18. The method as recited in claim 17, further comprising mounting the turbine component on a rotary table moveable independently of the robot.

19. The method as recited in claim 1, wherein the pulsed laser is moved using a laser galvano scanner.

* * * * *